(12) United States Patent
Trzecieski

(10) Patent No.: US 6,897,464 B2
(45) Date of Patent: May 24, 2005

(54) ACTIVE OPTICAL COMPONENT ALIGNMENT SYSTEM AND METHOD

(76) Inventor: Mike A. Trzecieski, 44 Crichton Street, Ottawa, Ontario (CA), K1M 1V7

( * ) Notice: Subject to any disclaimer, the term of this patent is extended or adjusted under 35 U.S.C. 154(b) by 337 days.

(21) Appl. No.: 10/316,007

(22) Filed: Dec. 11, 2002

(65) Prior Publication Data

US 2003/0201406 A1 Oct. 30, 2003

(30) Foreign Application Priority Data

Apr. 25, 2002 (CA) ................................. 2383318

(51) Int. Cl.$^7$ ............................................. G01N 21/86
(52) U.S. Cl. .................... 250/559.3; 250/216; 250/548; 356/400
(58) Field of Search ............................... 250/559.3, 216, 250/548; 318/568.11, 568.16; 356/399–400

(56) References Cited

U.S. PATENT DOCUMENTS 6,559,464 B1 * 5/2003 Flanders et al. ............. 250/548

* cited by examiner

Primary Examiner—Stephone B. Allen

(57) ABSTRACT

An alignment system and method is disclosed, the alignment system and method provide for alignment of at least one component to an optical signal using a neural controller circuit. The neural controller circuit facilitates parallel and sequential alignment of a plurality of components to the optical signal.

39 Claims, 13 Drawing Sheets

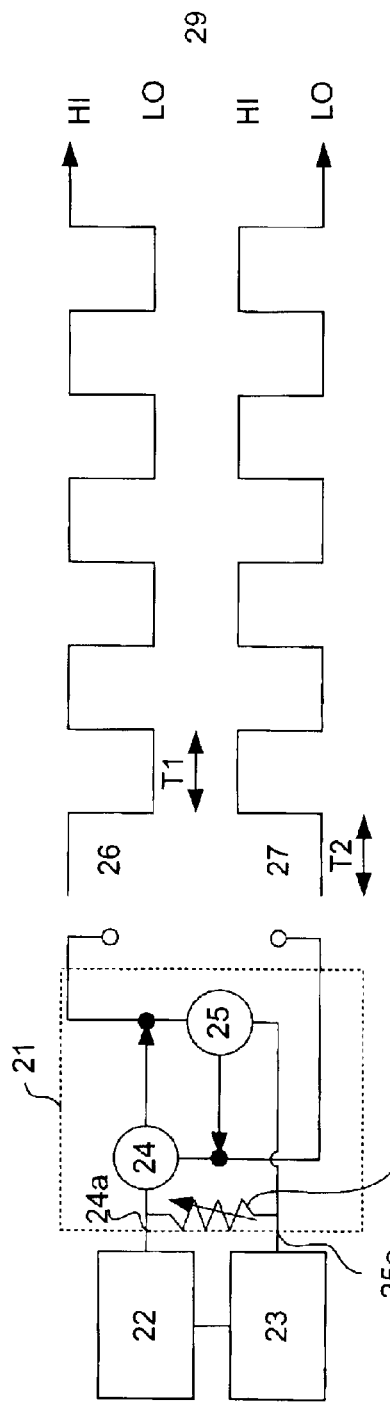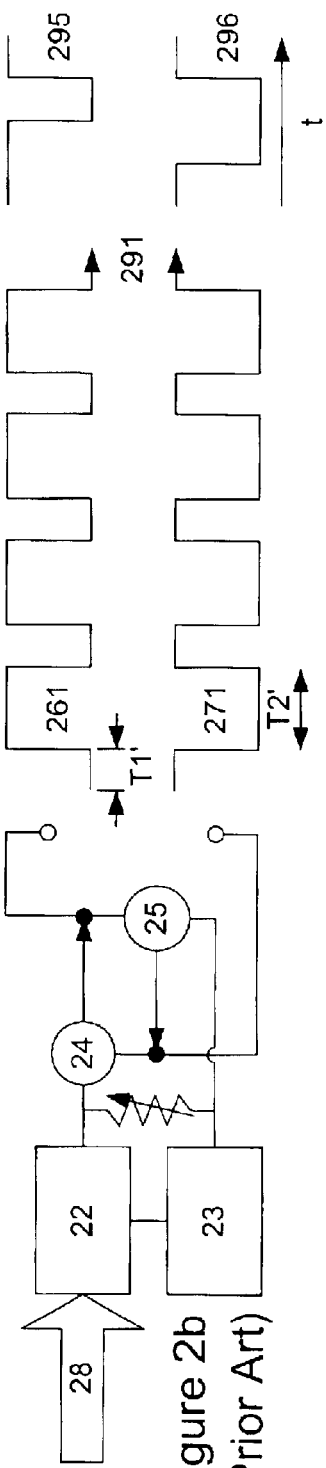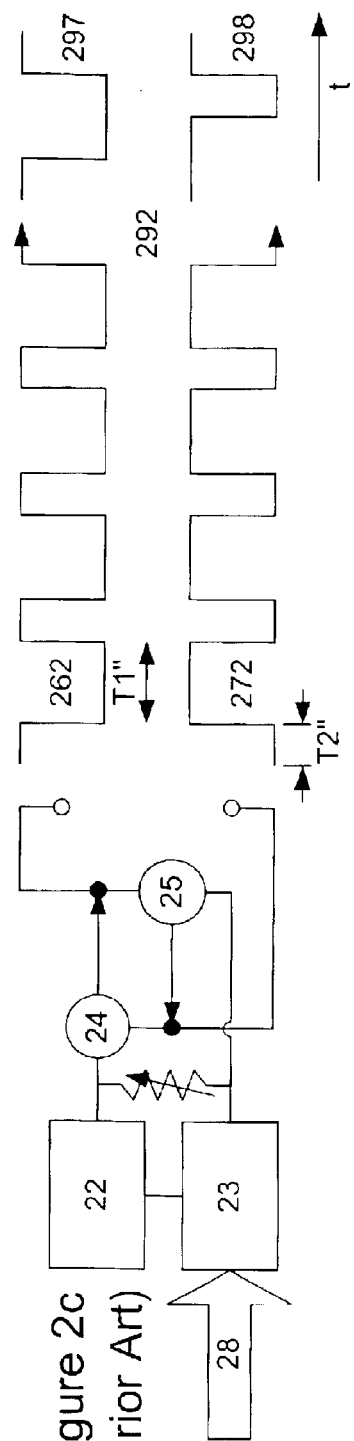
Figure 2a (Prior Art)
Figure 2b (Prior Art)
Figure 2c (Prior Art)

//ACTIVE OPTICAL COMPONENT ALIGNMENT SYSTEM AND METHOD

FIELD OF THE INVENTION

This invention relates generally to component alignment and more particularly to an apparatus for automatically aligning a plurality of components to a common optical signal.

BACKGROUND OF THE INVENTION

Illuminating a fiber with a laser source has enabled the size of the Internet to grow at tremendous speeds by providing for a very quick, high bandwidth, medium for communication. The basic building blocks behind the fiber optic internet are optical components, many of which use lenses, filters and various wavelength multiplexer and optomechanical components for their operation, some of which are waveguide based.

For a device to be useable in an optical communication system at some point at least one fiber, usually an input fiber, must be attached to an optical component. During the assembly of these devices at some point the light coming into the device from an optical fiber must be aligned to the optics block; and the light coming out must be aligned to an output fiber, or in the case of a multi-port device, output fibers. Typically, an input light source is used to illuminate a two-port transmissive optical component, such as a lens through a first input fiber. A detector is coupled for providing a feedback indicative of the optical insertion loss of the two-port device.

Actively aligning during assembly requires a positioning mechanism for positioning of the fibers relative to the optics block. This mechanism typically allows for translational motion of the fibers in three orthogonal directions. For each orthogonal axis, translating that axis results in the optical power changing as that axis is moved. An axis is optimally aligned when during translation the positioner is stopped at the point of maximum power. Upon optimizing of a single axis the procedure is repeated for all the other axes, until such a point is reached where altering the position of any axis in any direction results in the optical insertion loss to increase. Typically, this is done by a human operator actuating knobs to move the fibres.

Conventional means of assembling these optical components consists of using sub micron mechanical 3 axis translational positioners. Typically the Z-axis determines the focusing of the optical system where the X and Y directions are moved to ensure capturing of all the light and aligning the input to the optical block of the device. Optionally a 5 or 6 axis positioning mechanisms may also be used, where the three spherical added degrees of freedom add to further optimize optical parameters. Using more than 3-axis positioners however, leads to a progressively more complicated method of aligning the optical components.

Manually moving each of these axes independently in even a dual multi-axis positioner optical set-up results in a very slow method of aligning the input and the output ports in order to minimize the optical insertion loss. A possible improvement is to automate the positioning of some axes by using motorized positioners and a controller circuit with some form of feedback; for instance from a photodiode. A method which comprises: programming the controller to actuate the actuator of a single axis, while sampling the optical power and stopping translation upon reaching a maximum, then moving on to the next axis and repeating the same method for all other components.

Conventional multi axis positioners used in optical alignment set-ups are made of metal, have tight springs, slow motors and are quite bulky. Automating of these positioners with an actuating mechanism and using a control process result in optimal optical alignment, however the time required for achieving this is quite slow.

A conventional method used by a controller for controlling the positioning of an actuator for positioning of an optical component comprises: moving the optical component by a predetermined increment, sampling the optical power after each incremental, and using a decision process to determine whether the current position is desirable or whether to keep moving the component. Once the position of the optical component in this axis is desirable, the method is initiated on a subsequent axis. In the case where there are many optical components requiring optical alignment in the system, the process of making a decision at each increment leads to a very long time for obtaining desirable alignment. It is more advantageous to use a technique where multi-axis processes are run in parallel.

In many cases it is quite tedious to align a multi-axis multi-component optical set-up. Some complicated systems, for instance those used in holography set-ups, have a large number of multi-axis optical component positioning mechanisms. Where tweaking of each axis on each optical component positioning mechanisms is required to obtain desired optical propagation loss through the optical set-up.

Typically active optical alignment for an optical set-up uses sequential positioning of optical components axes. This results in the optimization of only one axis at a time, where in a complicated system with many components, multi axes optimization requires a long period of time. The controllers, actuators and optical component positioning stages are also expensive because of their high precision. Using an improved method of controlling optical component positions results in the ability to use less expensive actuator mechanisms as well as less expensive optical component positioning stages.

It is therefore an object of this invention to provide an alignment system, for controlling the alignment of components to an optical signal, such that there is a large time-saving realized over prior alignment methods through the use of parallel and sequential alignment capabilities of neural network controller.

SUMMARY OF THE INVENTION

In accordance with the invention there is provided an alignment system for aligning a first component in relation to an optical signal comprising:

an optical path having a path input port, for receiving light incident thereon from the optical signal, and a path output port;

a first photodetector optically coupled to the optical path output port for detecting incident light thereon and for generating a photocurrent signal in dependence thereon;

an actuator mechanism for moving, in response to a control signal, the first component within at least a portion of the optical path, between the path input port and the path output port, the actuator mechanism having a frequency response sufficiently high to allow displacement of the first component within the at least a portion of the optical path, resulting in an optical loss variation of less than a specified allowable optical loss for detection at the detector and caused by the first component displacement when the first component is approximately aligned within the at least a portion of the optical path about a point of substantial alignment; and, a controller circuit coupled to the photodetector for receiving the photocurrent signal, the controller circuit for providing the control signal to the actuator in dependence upon the photocurrent signal from the photodetector, where the control signal is indicative of a non-zero displacement of the first component about the point of substantial alignment within the at least a portion of the optical path.

In accordance with another aspect of the invention there is provided a method of aligning a component in relation to an optical signal comprising the steps of:

providing the component within at least a portion of an optical path having a path input port and a path output port;

providing an optical signal along the optical path;

iterating the steps of:

detecting light within an optical path and generating a photocurrent signal based thereon;

generating a control signal based on the photocurrent signal and based on past iterations;

moving, in response to the control signal, the first component, within at least a portion of the optical path between the path input port and the path output port, with a frequency response sufficiently high to allow displacement of the first component within the optic path resulting in an optical loss variation for detection; and, determining based on photocurrent from the first photodetector, during movement of the first component and based on a previous iterations, a first direction in relation to the optical path, wherein when the component is in an approximately aligned state the component has non-zero displacement about the approximately aligned state.

In accordance with another aspect of the invention there is provided a method of aligning a first component in relation to an optical signal comprising the steps of:

providing an optical path having a path input port, for receiving light incident thereon from the optical signal, and a path output port;

providing a first photodetector optically coupled to the path output port for detecting incident light and for each generating a photocurrent signal therefrom;

providing an actuator mechanism for moving, in response to a control signal, the first component, within at least a portion of the optical path between the path input port and the path output port, the actuator mechanism having a frequency response sufficiently high to allow displacement of the first component within the at least a portion of the optic path resulting in an optical loss variation detected at the detector;

providing a controller circuit coupled to the photodetector for receiving a photocurrent signal from each photodetector in dependence upon an intensity of light incident upon the photodetector and for providing a control signal to the actuator in dependence upon the photocurrent signal from the photodetector;

integrating photocurrent, over time, from the first photodetector during movement of the component by the actuator mechanism, in response to the control signal, within the at least a portion of the first optical path, from the first state to a second state, the component having a first displacement in a first direction in relation to the optical paths;

moving the component, within the at least a portion of the optical path, from the second state to a third state, the component having a second displacement in a second direction in relation to the optical paths;

integrating photocurrent, over time, from the first photodetector during movement of the component, within the at least a portion of the optical path, from the second state to the third state;

moving the component, within the at least a portion of the optical path, from the second state to a third state, the component having a third displacement in the first direction in relation to the optical paths;

integrating photocurrent, over time, from the first photodetector during movement of the component, within the at least a portion of the optical path, from the second state to the third state, wherein if an amount of integrated photocurrent, over time, during movement of the optical component from the second state to the third state is larger than an amount of integrated photocurrent, over time, during movement of the component from the first state to the second state, then the third displacement of the component is less than the second displacement.

BRIEF DESCRIPTION OF THE DRAWINGS

FIG. 2a is a diagram of two prior art neurons connected in a loop as well as showing output timing for the two neurons when no light is present on coupled photodiodes;

FIG. 2b is a diagram of two prior art neurons connected in a loop as well as showing output timing for the two neurons when no light is present on one of the coupled photodiodes;

FIG. 2c is a diagram of two prior art neurons connected in a loop as well as showing output timing for the two neurons when no light is present on the other one of the coupled photodiodes.

DETAILED DESCRIPTION OF THE INVENTION

The invention overcomes the limitations of the prior art by providing an improved method of controlling an actuating mechanism for the positioning of a component within an optical alignment system.

An optical component alignment system is proposed using a "neural controller" circuit coupled to a photodetector and to an actuator mechanism, wherein an optical intensity based feedback signal is provided by the photodetector to the neural controller as feedback indicative of the relative positioning of the optical component.

U.S. Pat. No. 5,325,031, in the name Tilden and entitled "Adaptive robotic nervous systems and control circuits therefor", herein incorporated by reference, discloses a coupled differentiator controller circuit which exhibits characteristics of biological neurons. Configurations of this "neuron" 10 are adaptable for use within a control circuit for automatically aligning optical components to a common optical signal. A figure of an examplary neuron circuit is shown in Prior Art FIG. 1a. The paper by Hasslacher, B. and Tilden, M. W., "Living Machines," Robotics and Autonomous Systems: The biology and technology of Intelligent Autonomous Agents, LANL 1995, also herein incorporated by reference, analyse the characteristics of the neuron.

Figure 1A:
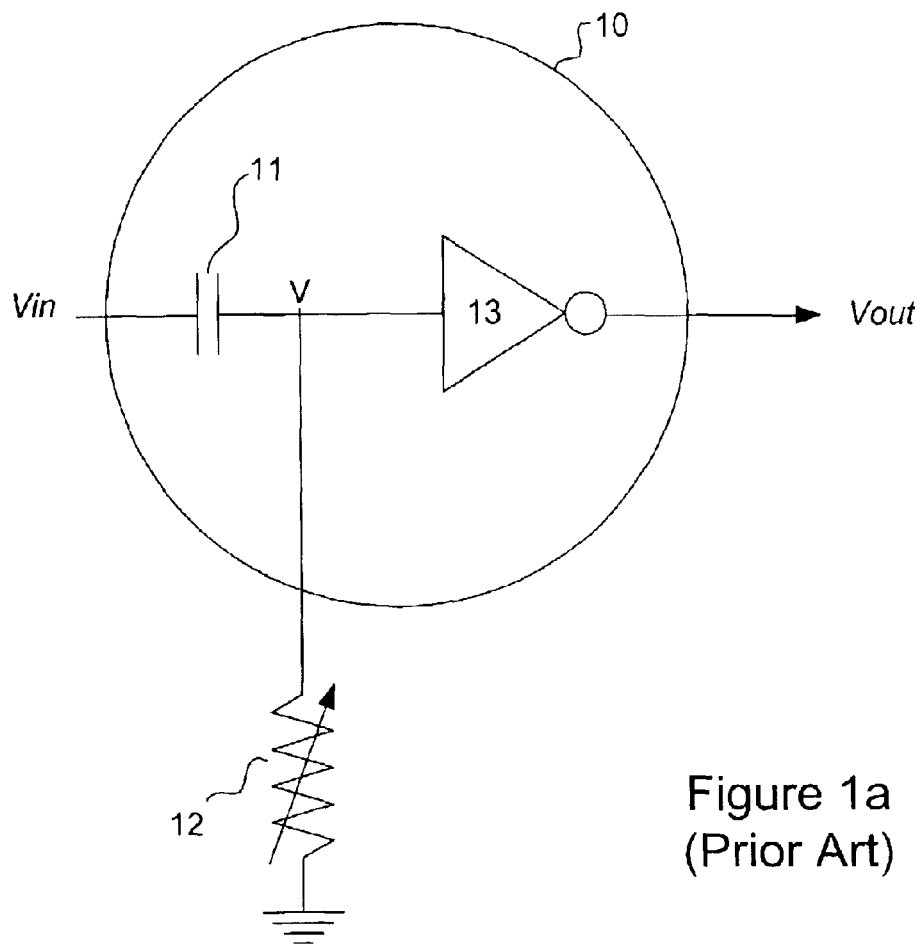
FIG. 1a is a Prior Art diagram of a neuron circuit.
Figure 1B:
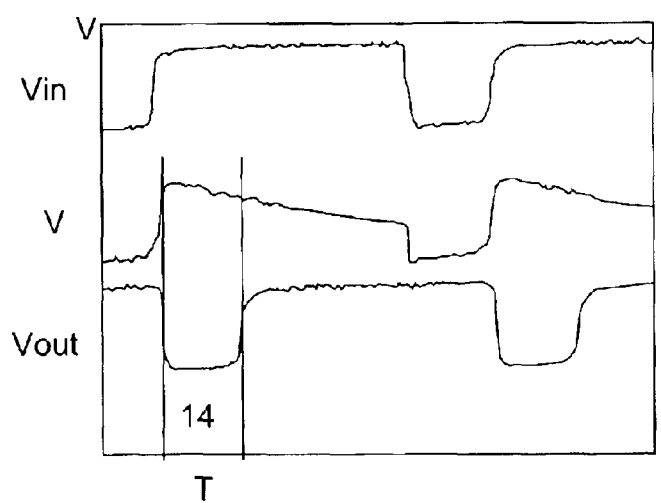
FIG. 1b is a voltage vs timing oscilloscope trace showing the prior art neuron circuit in use.

Referring to Prior Art FIG. 1a, a single "neuron" circuit is shown. Each neuron 10 provides a signal output signal 14, characterized by a length of time T 14 wherein the output signal is at a second, LO, level after having changed from a first, HI, level to the LO level and then returning to HI level. Capacitors 11 in this circuit are kept constant and inverter 13 parameters are also unvarying. Varying the resistors 12, controls the duration of the signal output T. This neuron 10 comprises a pulse delay circuit, as well as an input port and an output port. If a 2–5 Mohms resistance 12 is chosen, and if the capacitor 11 value is approximately 0.22 uf an active LO neuron output signal, T, of approximately 1 second in duration results. Prior Art FIG. 1b, illustrates oscilloscope traces indicating how voltages vary within the neuron while in operation. For an in input voltage Vin, a variation is shown in V, resulting in a neuron output signal having the voltage Vout.

Referring to Prior Art FIG. 2a, upon power up, two neurons 24 and 25, functionally same to the neuron 10, shown in FIG. 1, are electrically configured 21 to form an oscillator with dual complementary output signals 29. This coupling of the two neurons through their input and output ports in a predetermined fashion will be referred to as a (NC) neural controller 21, or neural controller circuit 21. Within the NC, two neurons 10 coupled together in a ring, wherein an output port of a first neuron 24 is coupled to an input port of a second neuron 25 and an output port of the second neuron 25 couples to an input port of the first neuron 24. A first photodetector is also coupled to the input port of the first neuron 24, and a second photodetector 23 is coupled to the input port of the second neuron 25. The photodetectors are coupled to the neural controller in such a manner that a property of resistance is used about the photodetector such that this resistance, when input to the input ports of the NC results in a change in the output signal times proportional to the input resistance of the photodetectors coupled thereto. A resistor 19 is coupled in parallel with the photodetectors to the NC input ports. Ports from each of the photodetectors 22 23 are also coupled together.

The first complementary output signal 26 has a first time duration of T1; the second complementary output signal 27 has a second time duration of T2. Both of these time durations are proportional to the input resistances of the photodetectors 22 and 23 coupled to the input ports of the neurons. Both same photodetectors, PD1 22 and PD2 23, are in a same dark condition. Each of the neurons provides a complementary output signal 29. For Nu1 24 the first output signal is characterized by a length of output signal time T1 where the first complementary output signal 26 is at a second level, LO, after having changed from a first level, HI. While the first complementary output signal is at a second level, LO, the second complementary output signal is at the first level, HI, for the time T1. For Nu2 25 the second complementary output signal 27 is characterized by a length of signal time T2, where the second complementary output signal is at the second level, LO. After signal time T2 has elapsed the second complementary output signal returns back to the first level. HI and LO refer to logic levels, such as those used in inverting type electrical integrated circuits.

The NC output signal levels are complementary, since the neurons are coupled together in the dual neuron ring architecture forming the NC 21. Of course the ring architecture does not have to be limited to only two rings of coupled neurons, a plurality of neurons may also be coupled together in rings 135. However in a simplest useful embodiment, having two neurons coupled together makes it easier to perform optical alignment. A base frequency of one of the output signals from one of the neurons is proportional to the light intensity applied to the coupled photodetectors 22 23. The NC integrates the resistance applied to NC input ports 24a, 25a, over time. In this case, the integrated resistance applied to the input ports is: the resistance of two photodetectors, either forward or reverse biased, in parallel with a variable potentiometer 19. The potentiometer 19, in parallel with the photodetectors 22 and 23, is used to tune the base frequency of the NC. The bass frequency is a lower frequency of either of the two neural controller complementary output times T1 and T2. Therefore it T1 is of a longer duration than T2; T1 will set the base frequency. With no light incident on the photodetectors the resistance of the two photodetectors 22 and 23 is equal and results in approximately same complementary output signal times T1 and T2.

As can be seen in FIG. 2b, the system is unbalanced with a light source 28 illuminating one photodetector 22. As a result the signal times T1' and T2' for each of the neural controller complementary output signals 261 and 271 are not equal. The first complementary output signal of Nu1 24, has a signal time T1' of shorter duration than T2' because of the decreased resistance of the coupled PD1 22 in response to the illuminating light source 28. The signal time T2' of Nu2 25 remains relatively unchanged in signal time duration, however due to the nature of the NC a portion coupled through to the first neuron such that this information resulting from the increased resistance applied to one of the NC input ports is not lost by the circuit. Taking a time average 295 of the first complementary output signal over a known time and taking a time average 296 of the second complementary output signal at the same known time, results in the first neuron spending less time 295 in the active LO state.

As is seen in Prior Art FIG. 2c, when the NC becomes unbalanced in the other direction, with a light source 28 illuminating the second photodetector PD2 23, the neural controller complementary output signals 292 and characterized by the signal times T1" 262 and T2" 272 again will not be equal in time duration. At the output of Nu2 25, the signal time T2" is of shorter duration than the signal time T1" because of the decreased resistance of PD2 23 in response to the illuminating light source 28. The signal time T1" of Nu1 24 remains relatively unchanged. Taking a time average 297 of the first complementary output signal 262 over a known time, and taking a time average 298 of the second complementary output signal 272 at the same known time, results in the second neuron spending less time 298 in the active LO state, than the time spend active 297 by the first neuron. Within the NC only one output is active, active LO, at a time, corresponding to photodetector input. As more light illuminates one of the photodetectors the time average of the neural controller complementary output signal corresponding to the illuminated photodetector will decrease because of the decreased resistance present on the NC input ports.

Figure 3:
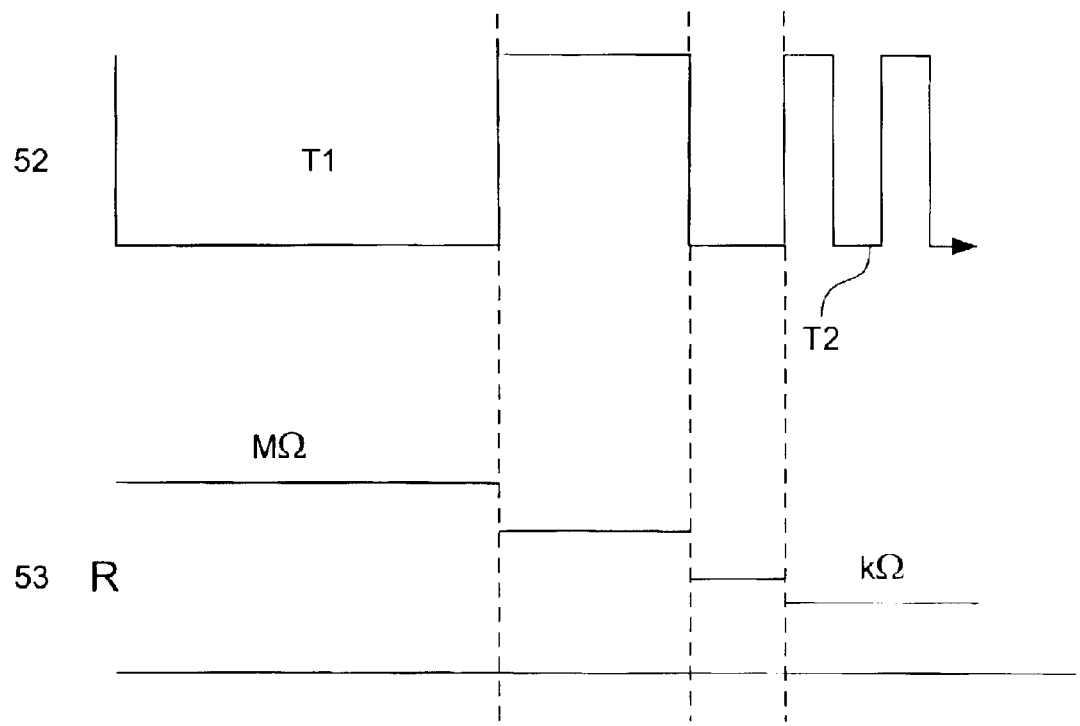
FIG. 3 illustrates an output of one of the two prior art neurons connected in a loop as a function of varying resistance applied on an input port of the neuron.

Prior Art FIG. 3 illustrates how the output signal time for one neuron 52, within the NC, varies as applied input resistance 53 to the input port of that neuron is varied. With no light applied to the photodetector a high photodetector resistance is present on the NC input port and as a result the NC output signal 52 is of a first time duration T1. As the intensity of applied light to the coupled photodetector is increased, the resistance of the detector 53 will decrease and the output signal time will decrease in duration. The time duration of the output signal will decrease from an initial resistance in the order of MΩ, until a time T2, where the resistance is in the order of kΩ. The NC therefore operates as an analog intensity to pulse length converter. As the intensity is increased the time duration of the output signal decreases, as does the pulse length. Since the resistance is no longer changing after having an output signal time T2, the output signal time will remain essentially constant.

Figure 4A:
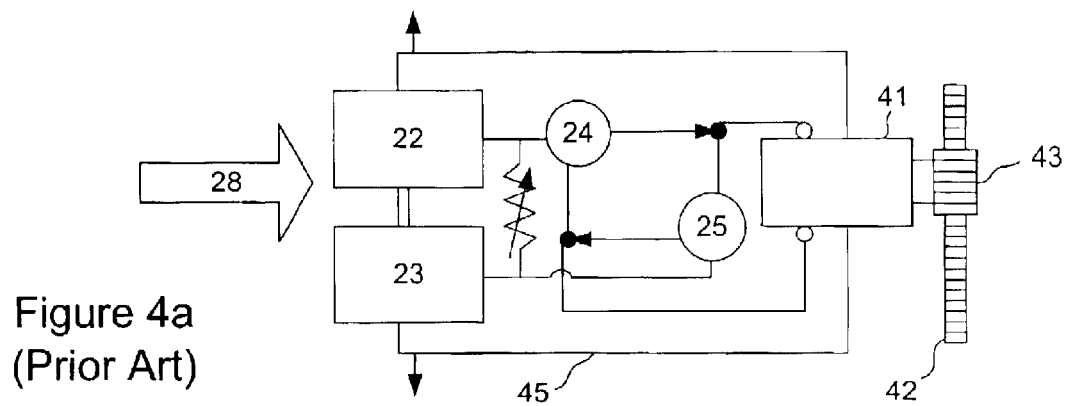
FIG. 4a illustrates a prior art neural controller experimental setup using two photodetector for alignment to an optical source.
Figure 4B:
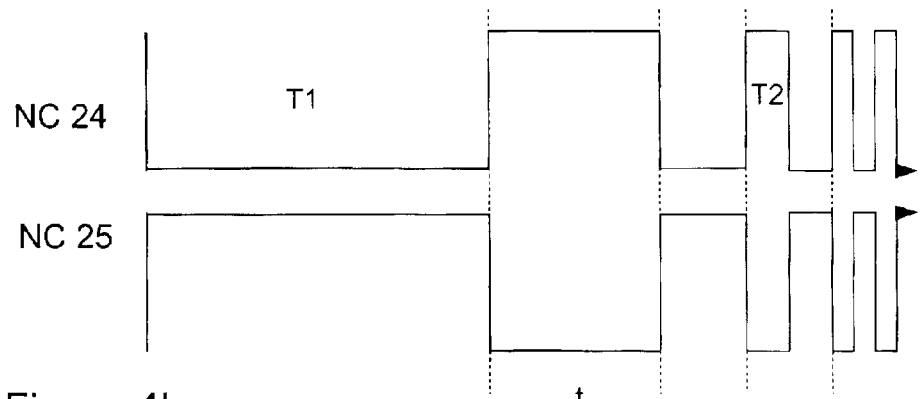
FIG. 4b illustrates output signal times of the prior art neuron circuit while aligning to the optical source.

FIG. 4a discloses a prior art mechanism for aligning two photodetectors 22 and 23 to a fixed light source 28; fixedly mounted in relation to a rack 42. A DC motor 41 is coupled to a rack 42, via a pinion gear assembly 43. Prior Art FIG. 4b shows NC complementary output signals during use of the platform 45 in alignment of to the light source 28.

In use, a voltage applied to either of the terminals of the motor 41 from the coupled NC, will result in a translation of the photodetectors 22 23 mounted to a moveable platform 45, in a direction, past the light source 28, in response to the complementary output signals, NC 24 and NC 25 from the NC. In Prior Art FIG. 4c, only detectors 22, 23 are shown for clarity. The detectors change in position PX, in response to the complementary output signals as the motor moves the moveable platform 45 of FIG. 4a.

In this case the alignment method is initiated when the NC output neuron 24 undergoes a transition from a HI to LO. The integrated resistance on PD1 22 is high, because it has not been illuminated by the light in state 1, and therefore the duration of the output signal T1 is long in time. The time duration of the output signal causes a large translation, PX, of the moveable platform 45 in a direction to the proximity of a second state 2. During this movement, the second detector 23 is read by the NC and the NC integrates the transformed optical power detected by the photodetector. At the second state 2, the NC undergoes a second transition as the output of Nu2 NC 25 falls from HI to LO after time T1 has elapsed. This causes movement of the moveable platform to a third state 3. While moving, the NC integrates the photocurrent detected by the first photodetector 22 as it moves past the light source 28. However, since the previous move from the first state to the second state, resulted in the second photodetector 23 responding to more light from the source 28. The displacement is decreased, PX, the integrated resistance read by the NC is lower, and hence the movement of PX from the second state 2 to the third state 3 will be less than from the first to the second. T2 is shorter in time than T1 and as a result the difference in PX will be smaller for translation of the platform 45 from the second state 2 to the third state 3.

The NC configured as shown in prior art FIG. 4a, exhibits system with inherent convergence properties. The neural controller 21 oscillates the platform 45 in such a manner as to dynamically balance the integrated optical power illuminating both photodetectors 22 and 23. The NC creates a form of lock-in detection, initiating the read of one of the two photodetector after the transition edge from HI to LO while integrating the optical power on the one of two photodetectors until a transition back to a HI level.

At point 7 the relative displacement of the platform PX from state 7 to state 8, is equal to an approximately equal displacement from state 8 to state 9. In this state the integrated optical power read by the NC on one of the photodetectors, while moving, the optical component from states 7 to 8, is approximately equal to the integrated optical power as the optical component moves from state 8 to state 9. The optical component oscillates with a similar displacement, PX, as the displacement between the last two states. This results in a net optical power detected on both detectors having a ripple in optical power proportional to the change in detected optical loss during the translation of the detectors between states. As the intensity of the light source is increased the displacement PX between these two states will decrease until such a point is reached when the actuator, platform and optical component no longer have a high enough frequency response to respond to the NC complementary output signal frequency, this frequency will be referred to as the lockup frequency 62.

Figure 4C:
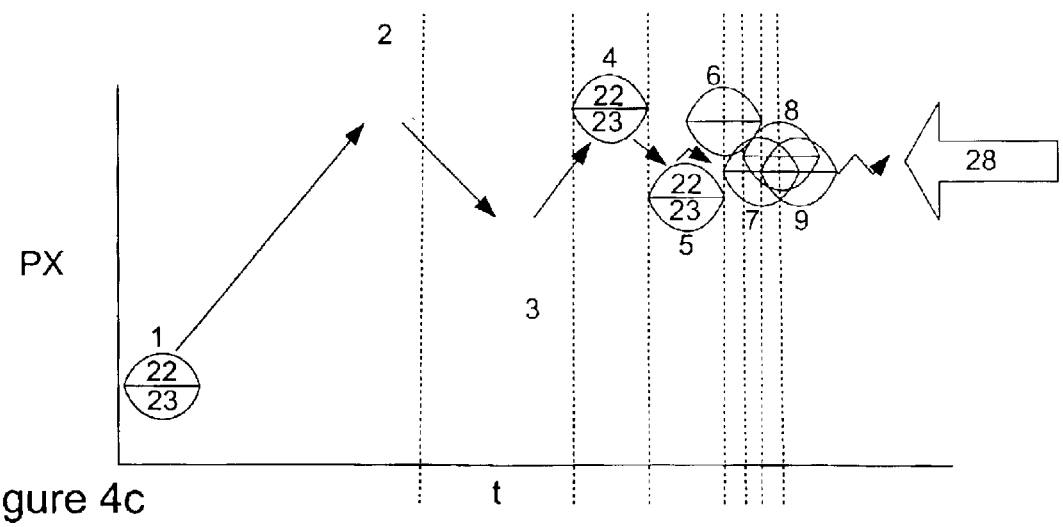
FIG. 4c illustrates the position of photodetector elements in relation to the optical source hile aligning to the optical source.
Figure 4D:
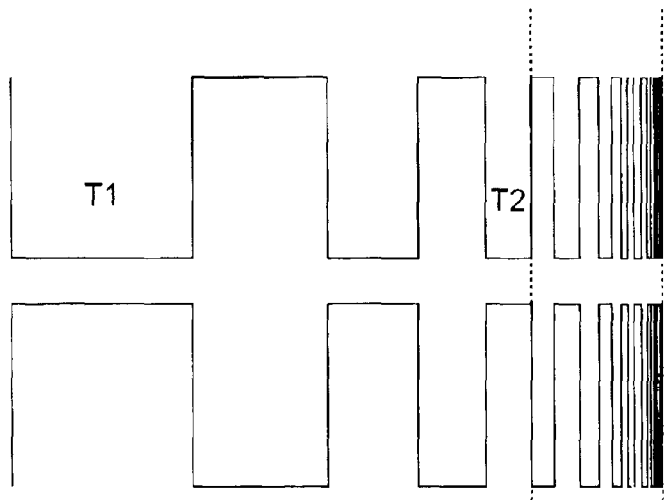
FIG. 4d illustrates a point where lockup of the actuator occurs in response to neural controller output signals.
Figure 4E:
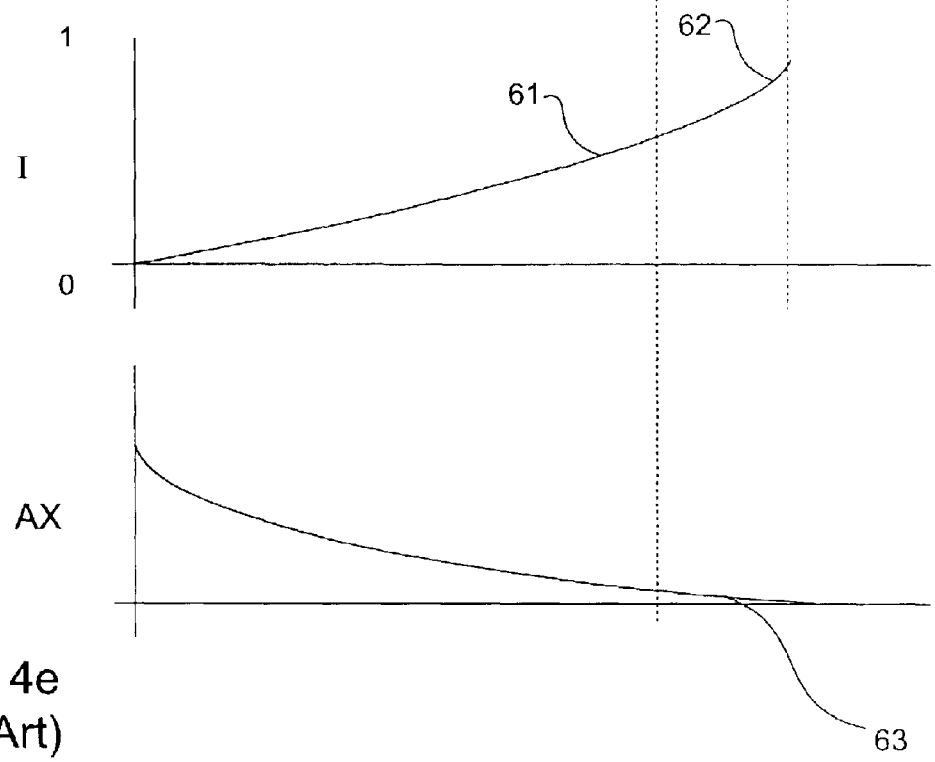
FIG. 4e illustrates average displacement of an actuator prior to operating at a lockup condition in response to neural controller output signals.

Prior Art, FIG. 4d, shows a point where the lockup frequency occurs 62 with respect to the NC complementary output signals. The relationship between optical intensity, I, and average platform displacement, AX, as a function of time, is shown in FIG. 4e. As can be seen the bi-directional displacement, AX, of platform decreases as the NC complementary output signals align the platform 45 to the light source 28. Displacement decreases since the optical intensity increases. At the point 61 approaching the actuator lockup frequency average displacement, AX, of the platform 45 is minimal 63. As the optical intensity of the light source is increased, NC complementary output signal frequencies will approach the lockup frequency 62. At this point the actuator will cease to respond to changes in the NC output signals, and the optical component displacement AX is almost negligible in response to varying control signals shown in FIG. 4d.

Figure 5:
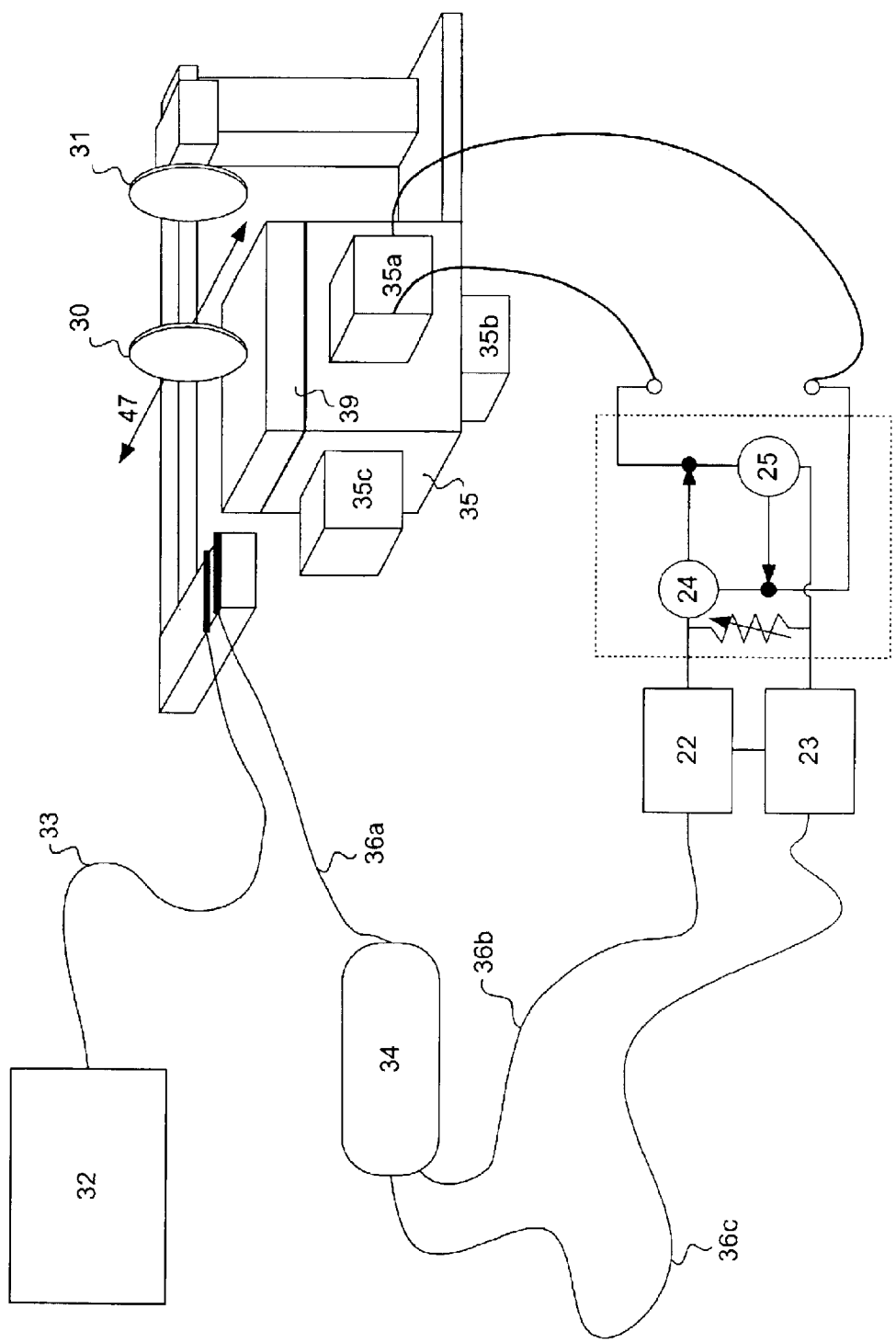
FIG. 5 illustrates the primary embodiment of the invention, a automated single axis optical alignment system.

The primary embodiment of the invention is shown in FIG. 5, the NC circuit 21 is used for obtaining automated alignment of a component 30, in the form of an optical component, to a light source 32. The light source 32, is optically coupled to a first optical fibre 33, providing light to the component 30. Light passes through the component 30 and is reflected from off a stationary mirror 31, and passes back through the same component and illuminates a second other optical fibre 36a. Both optical fibres 33 and 36a are fixedly mounted to the mirror 31 and an component positioning stage 35. The optical component 30 is coupled to a single axis moveable platform 39 as a moveable part of the stage 35.

Light from the second other optical fibre 36a is optically coupled to a power splitter 34, with each of the power splitter 34 output ports, 36b and 36c, optically coupled to a photodetector, 22 and 23. Photodetectors, 22 and 23 are coupled to the NC 21 input ports. The two NC 21 output ports are coupled to a DC motor as part 35a of the motorized component positioning stage 35. Only one axis 35a uses a motorized linear actuator mechanism, comprising a DC motor coupled to lead screw assembly as the moveable platform 39 actuation mechanism 35a. The NC output port corresponding to the first complementary output signal is coupled to a first terminal of the linear actuator 35a, and the NC output port corresponding to the second complementary output signal is coupled to a second terminal of the linear actuator 35a.

The second 35b and third axes 35c of the component positioning stage 35, optical fibres, and the mirror, are aligned in such manner that automated movement of the component parallel to the first axis 35a, results in an optical intensity profile having a high optical loss detected towards extremes of the component translation boundaries and having a lower loss closer to the component position of optimal alignment.

In use, the NC controller coupled to the DC motor 35a, makes the DC motor 35a turn in both directions in response to the NC complementary output signal. This results in an oscillatory motion of the component 30 coupled to the platform 39; starting motion at an initial base frequency, in response to output signal times T1 and T2. Of course the signal times are dependent upon the integrated resistance of the photodetectors 22 and 23 during dynamic movement 47 of the component.

A higher optical power illuminating the photodetectors results in a lower resistance on the photodetectors and hence a smaller displacement of the component 30, as shown in FIG. 4c. A lower optical power illuminating the photodetectors results in a higher resistance on the photodetectors and hence a larger displacement of the component.

The NC causes asymmetric displacement 47 of the component in a direction towards a lower insertion loss through optimization for a balanced input resistance and hence lower optical loss. Through these oscillations the component is aligned to the optical signal such that it oscillates about the point of optimal alignment, with a displacement proportional to the total detected light intensity. At this point if the intensity of the optical source is increased, or if the resistance of the base frequency resistor 19 is decreased, then a point of optimal alignment is reached where the optical loss is at a minimum. In dependence upon the resistance on the NC input ports, this point of optimum alignment may corresponds to the lockup frequency.

Figure 6:
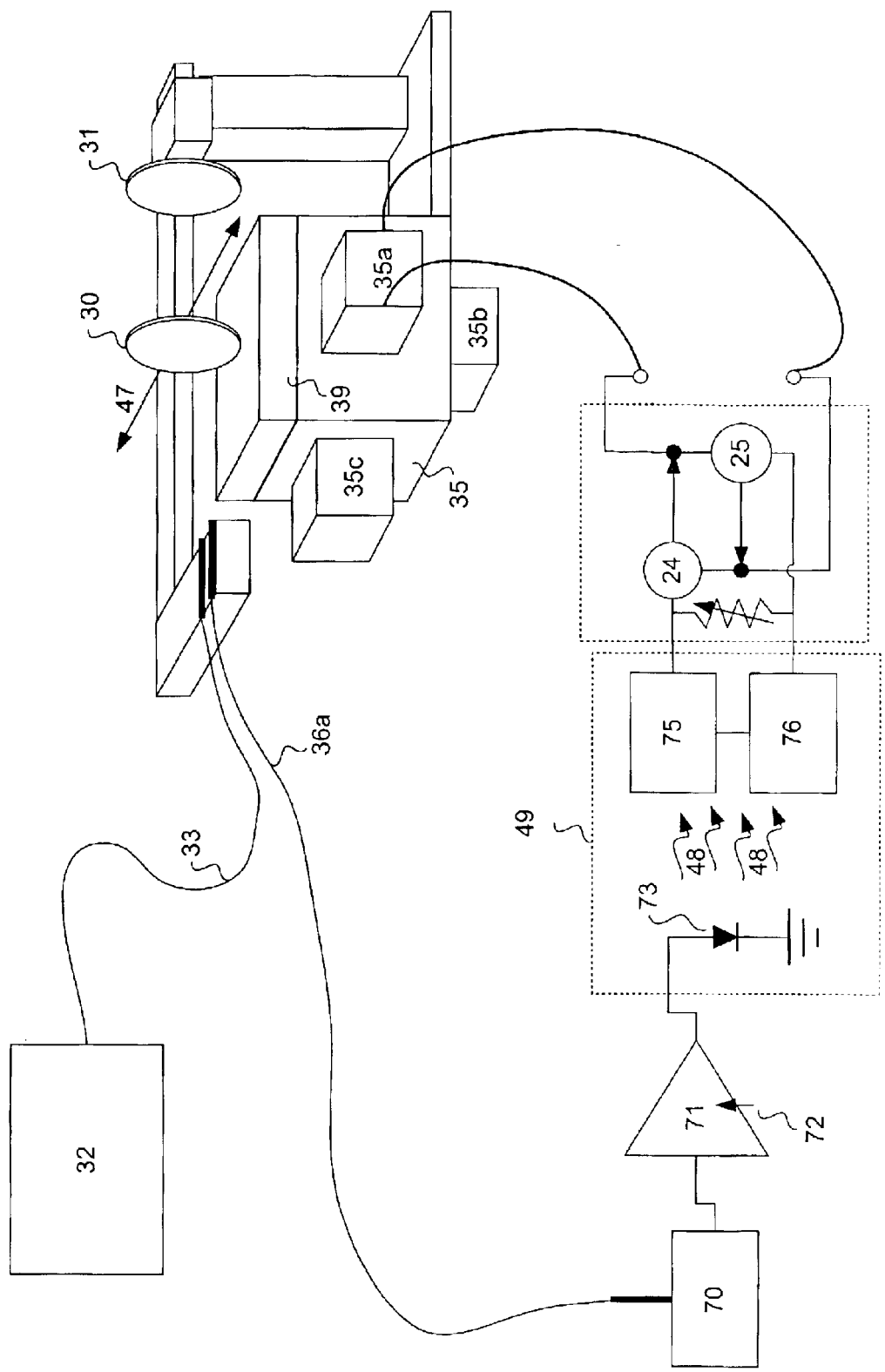
FIG. 6 illustrates the secondary embodiment of the invention, a single photodetector optical alignment system using optical signal coupling between the photodetector and neural controller using an optical coupling source.

In FIG. 6, a secondary embodiment of the invention is shown. In this case, the same component 30 positionable in a single axis 35a using a same three axis positioner 35 as was demonstrated in FIG. 5. A light source 32 is optically coupled into a first fiber 33, providing light to the component 30. Light passes through the component and is reflected from a mirror 31 and passes back through the component and illuminates a second other optical fiber 36a. Light from the second optical fiber 36a, optically couples into a photodetector 70. The photodetector 70 output port is coupled to a controllable gain amplifier circuit (CGA) 71, with the output port of the CGA coupled to an optical coupling source photodiode (OCS) 73. The OCS 73 is optically coupled via an optically communicative 48 environment 49 to a pair of optical coupler detector, OCD1 75 and OCD2 76. OCD1 75 and OCD2 76 couple into the NC 21 input ports of Nu1 and Nu2. The optically communicative environment permits exchange of optical alignment signal data between a detected and amplified optical signal and NC optically coupled thereto. The CGA circuit is designed to generate a predetermined voltage output on the CGA output port in dependence upon received photocurrent. The voltage output provided to the OCS is either logarithmic, linear; AC coupled, or of some calibrated relationship in dependence upon received photocurrent from the photodetector.

In use the alignment system shown in FIG. 6 behaves almost identically to that shown in FIG. 5. However, in this case a variable gain control port 72 is provided as part of the CGA circuit 71. This obviated the need for increasing the optical power of the light source 32 during execution of the alignment method, when attempting to reach the lockup frequency. Increasing the gain 72 on the CGA 71 causes the base frequency of the neural controller to increase since the emitted light intensity 48 of OCS 73 increases and as a result decreases the resistance of OCD1 75 and OCD2 76.

Initially a lower base frequency is desired and so the gain of the CGA circuit 71 is set low as the alignment method begins to execute, thereby initially allowing for a larger bi-directional optical component displacement 47. Photodetectors, OCD1 75 and OCD2 76 are responsive to variations in optical power of OCS 73 as the optical power varies on the photodetector 70. Coupled optical power illuminating PDLS1 70 with the movement of the component, resulting in the intensity of OCS 73 to vary, in relation to the optical power variations detected on the photodetector 70, after amplification by the CGA 71. Increasing the gain 72 on the CGA 71 causes the base frequency to increase until such a point is reached where the base frequency causes the system to reach the lockup frequency. The actuator and positioning stage mechanically integrate the neural controller complementary output signal through the response time of various components making up the actuator, such as the DC motor, lead screw assembly, actuator moveable stage and optical component. The active LO of the complementary output signal is varying fast enough that the first complementary output signal is not of enough time duration to displace the actuator in a direction before the second complementary output signal causes displacement of the actuator in the other direction.

Optically coupling of PDLS1 70 in this manner to the neural controller circuit 21 offers the benefit of varying the gain 72 on the CGA circuit 71 to facilitate varying of the base frequency, thereby increasing or decreasing the component bi-directional displacement in response to NC complementary output signal. It also allows for coupling of multiple NCs to a same OCS 73 such that an optical component can be disposed between the OCS and coupling detectors for modifying portions of the light emitted from the OCS.

Figure 7:
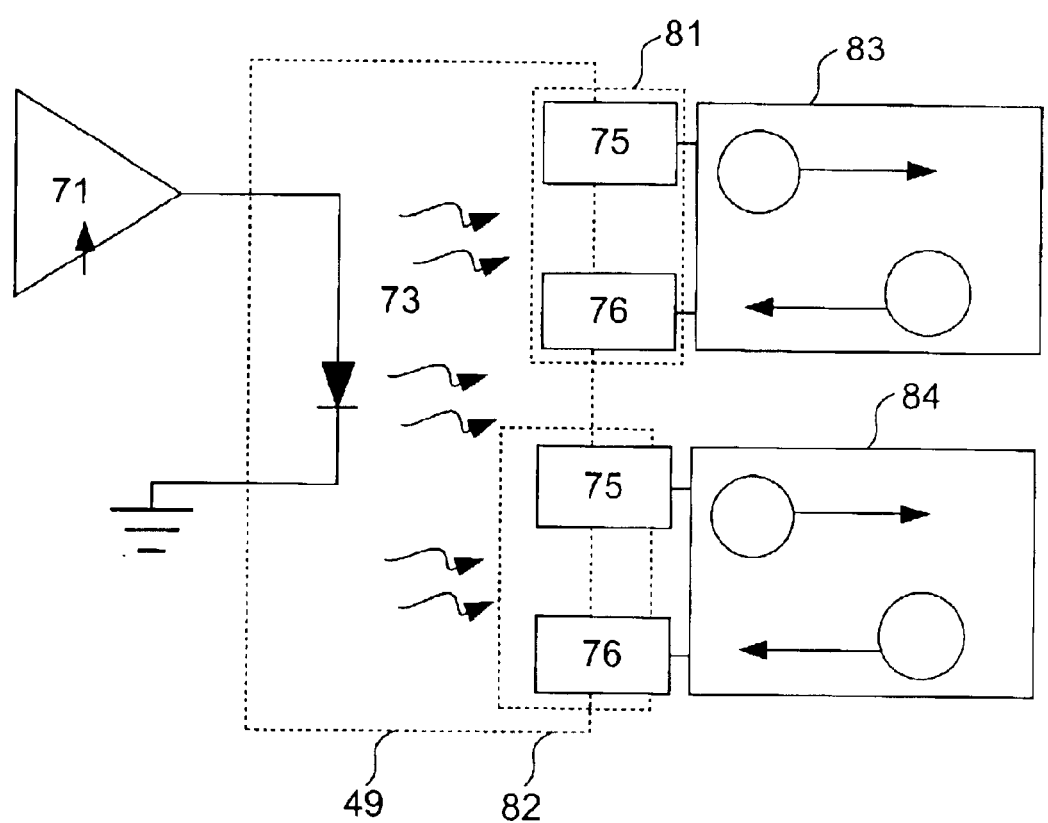
FIG. 7 illustrates optical alignment signal coupling between two neural controller circuits and an optically coupled configurable gain amplifier.

FIG. 7 shows the optical coupling between the CGA circuit 71, OCS 73, and two NCs 83 and 84. Each of the NC have two optical coupler photodetectors, OCD1 75 and OCD2 76 coupled thereto. In a first coupling orientation 81 the anode of the photodetector 75 is coupled to the anode of the photodetector 76, with cathodes both coupled to a first NC 83. In a second coupling orientation 82 the cathode of the photodetector 75 is coupled to the cathode of the photodetector 76, with anodes coupled to a second NC 84. Either coupling configuration works for purposes of optically coupling the optical alignment signal to the NCs.

This arrangement allows for two neural controller circuits 83 and 84, to read from the same photodetector 70 without mutually interfering. Coupling of the neural controllers in such a manner to a common detector allows for simultaneous execution of the alignment methods within both neural controller circuits. This allows the possibility for two independent alignment processes to execute within each neural controller. This type of controller circuit arrangement can be used in the aligning of the component in two axes simultaneously to the optical signal.

Figure 8:
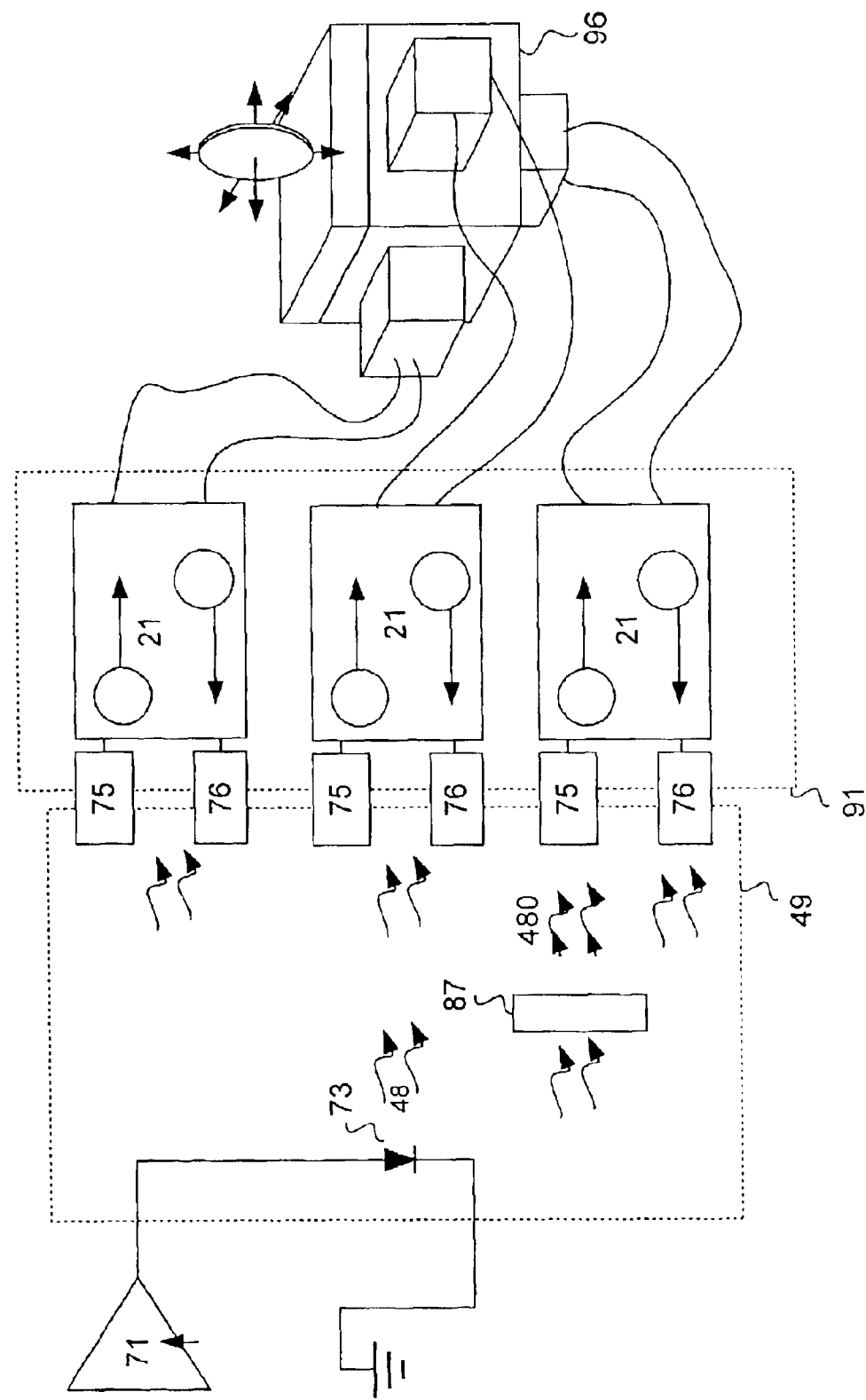
FIG. 8 illustrates placement of optical elements between the coupling source and coupling detectors.

In the embodiment of FIG. 8, a single CGA circuit 71 is optically coupled 48 using an OCS 73 to each of the input ports of three NC circuits 21, within an optically communicative medium 49. Each NC 21 has its output ports coupled to each axis of a motorized three-axis component positioning mechanism 94. An optical stage controller (OSC) 91, comprises three NC circuits 21, with each NC circuit having a provision for optically coupling an OCS 73 thereto. An optical element 87 is disposed between the light emitted 48 from the OCS, and one of the coupling photodetectors 75. The optical element 87 changes the properties of the light 480 that interact with the optical element 87. As a result the light intensity seen by OCD1 as part of the third NC circuit will be altered. If this optical element is an attenuator then the transmitted 480 light intensity will be decreased, if it is a spectral filtering element, then the OCD1, as part of the third NC, will be illuminated by the spectrally filtered portion of the light. This allows for filtering or attenuating of the light incident into a portion of this NC. Thereby offering an optical method for optically tuning the base frequency in response to the filtered or attenuated light. Advantageously, through adding of active and passive optical elements, additional optical processing on the optically coupled alignment signal can take place during alignment of a plurality of components to the optical signal.

Figure 9:
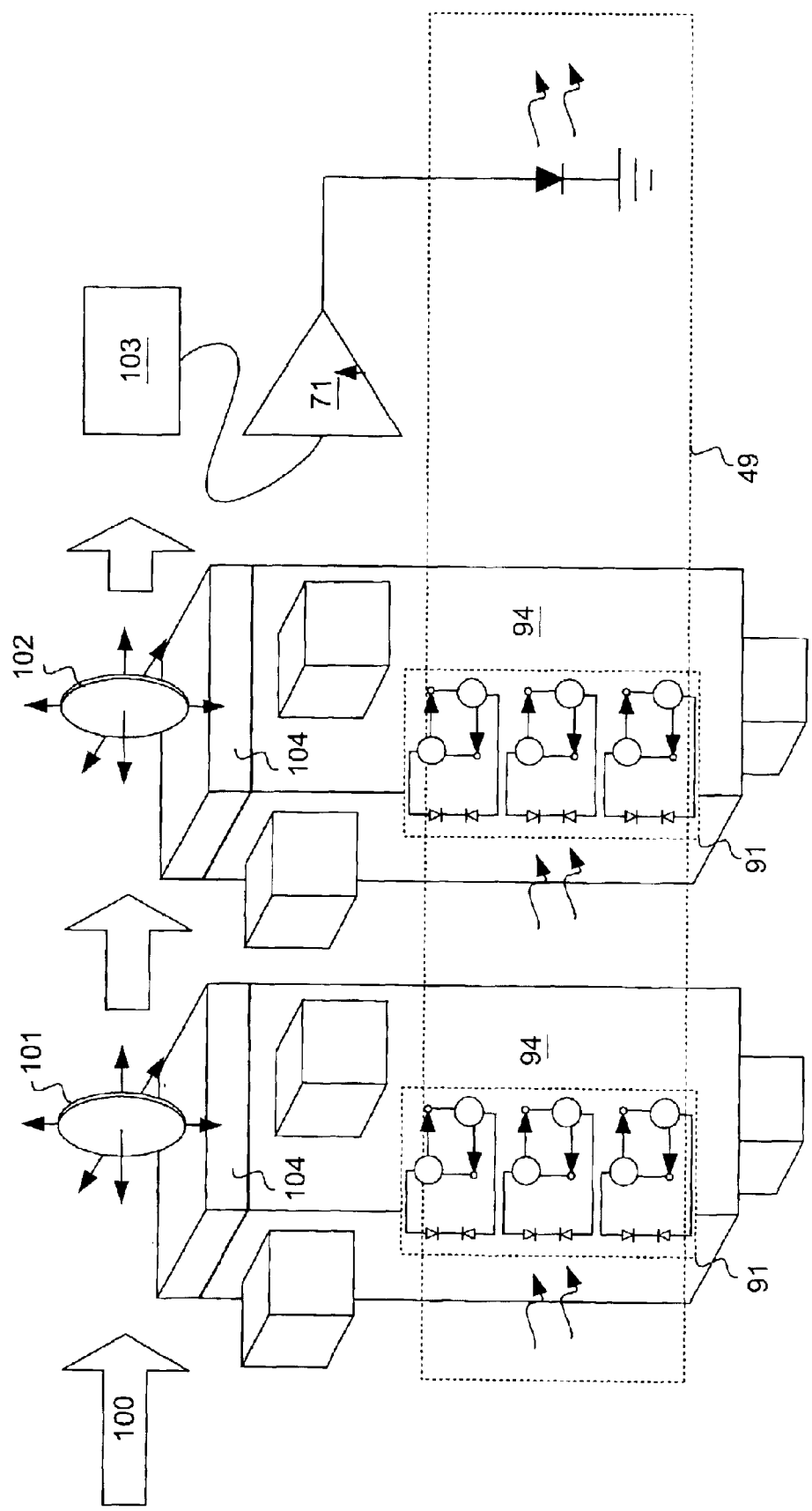
FIG. 9 illustrates the coupling between a configurable gain amplifier circuit and two positioning stages.

The embodiment of FIG. 9, shows an alignment system wherein a light source 100 transmits light through a first component 101 via second component 102 into a photodetector 103. Each of the components is coupled to a multi axis, moveable portion 104, of the three-axis motorized component positioning mechanism 94. Each of the two OSC 91 output ports are coupled to each of the three-axis motorized component positioning mechanism 94 motorized axes. Light received by the photodetector 103 is coupled to the CGA circuit 71. The CGA OCS is optically coupled to each of the two OSCs 91 through the optically communicative medium 49.

The alignment method is initiated on both components 101 and 102, in three axes, in response to the light source 100 illuminating the photodetector 103. Up to six alignment processes execute within the optically coupled NCs. Both components are aligned in three axes in such a manner that after alignment an obtainable maximum amount of light from the source 100 is illuminating the photodetector 103.

Figure 10:
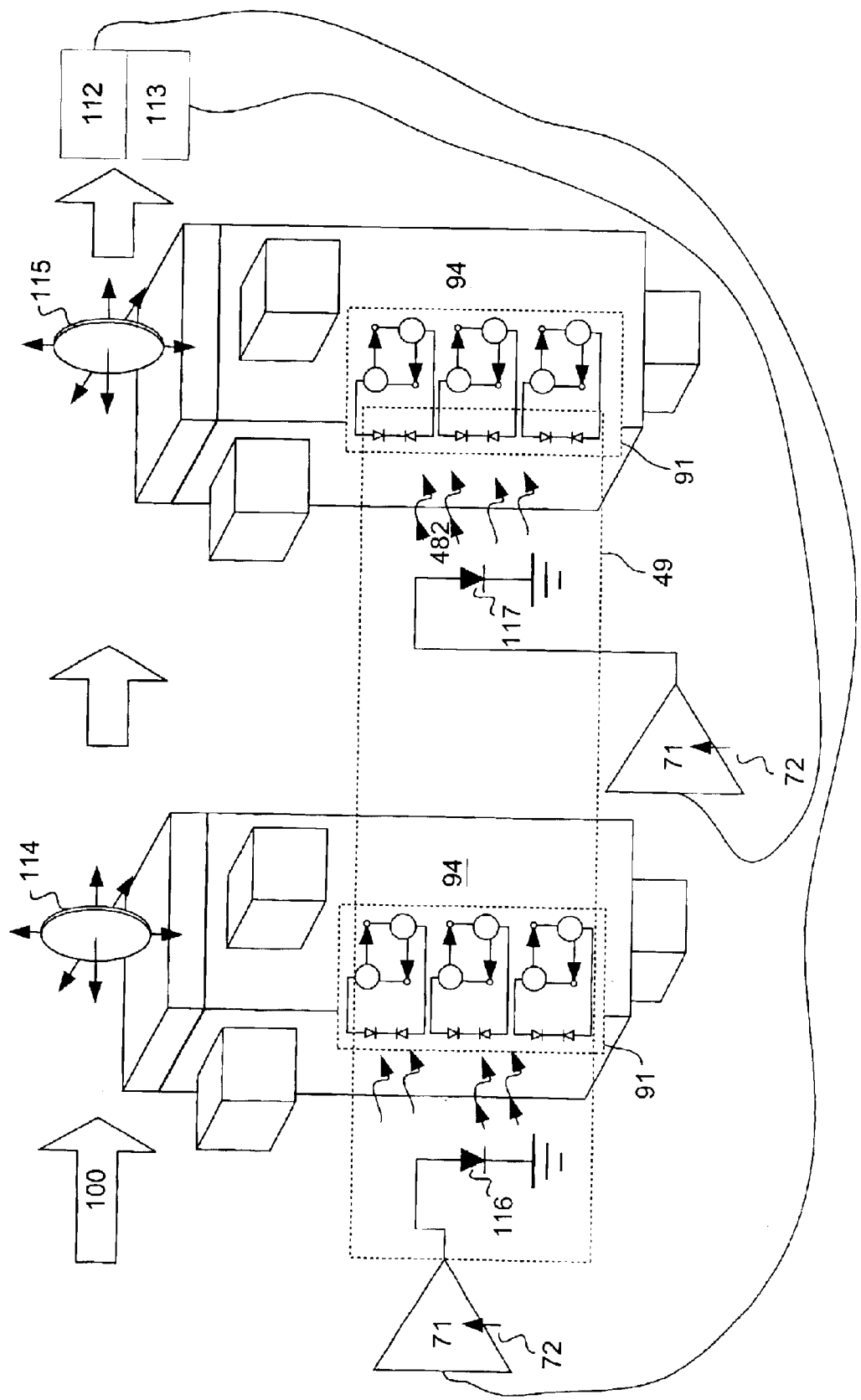
FIG. 10 illustrates a dual detector, dual amplifier automated component alignment system.

In the embodiment shown in FIG. 10, a light source 100 is incident on an optical system, illuminating two components, 114, 115, and two detectors 112 and 113. The photodetector 112 is coupled to a first CGA circuit 71 and the other photodetector 113 is coupled to a second CGA circuit 71. An output signal from the first CGA is coupled to an OCS 116, having a first predetermined spectral characteristic; an output signal from the second CGA is coupled to an OCS 117, having a second predetermined spectral characteristic. Light from the first OCS 116 emits light with a first wavelength 48. Light from the second OCS 117 emits light with a second wavelength 482. Light from both OCSs falls on either one of the OSCs optically coupled to both OCSs. Each of the OSC 91 output ports is coupled to an actuator on each axis of the three-axis motorized component positioning mechanism 94.

The alignment method executes within each of the NC within the OSC 91, for the automated positioning of the two components, in three axes, in response to the light source illuminating the two photodetectors. Each of the gain profiles within the CGA circuits is variable and as such is experimentally determined to offer optimal alignment. The portion of the optical coupling between each OCS and each OSC is also variable and experimentally determined. In some cases it may be advantageous to provide an increased optical signal from one of the OCSs.

Figure 11:
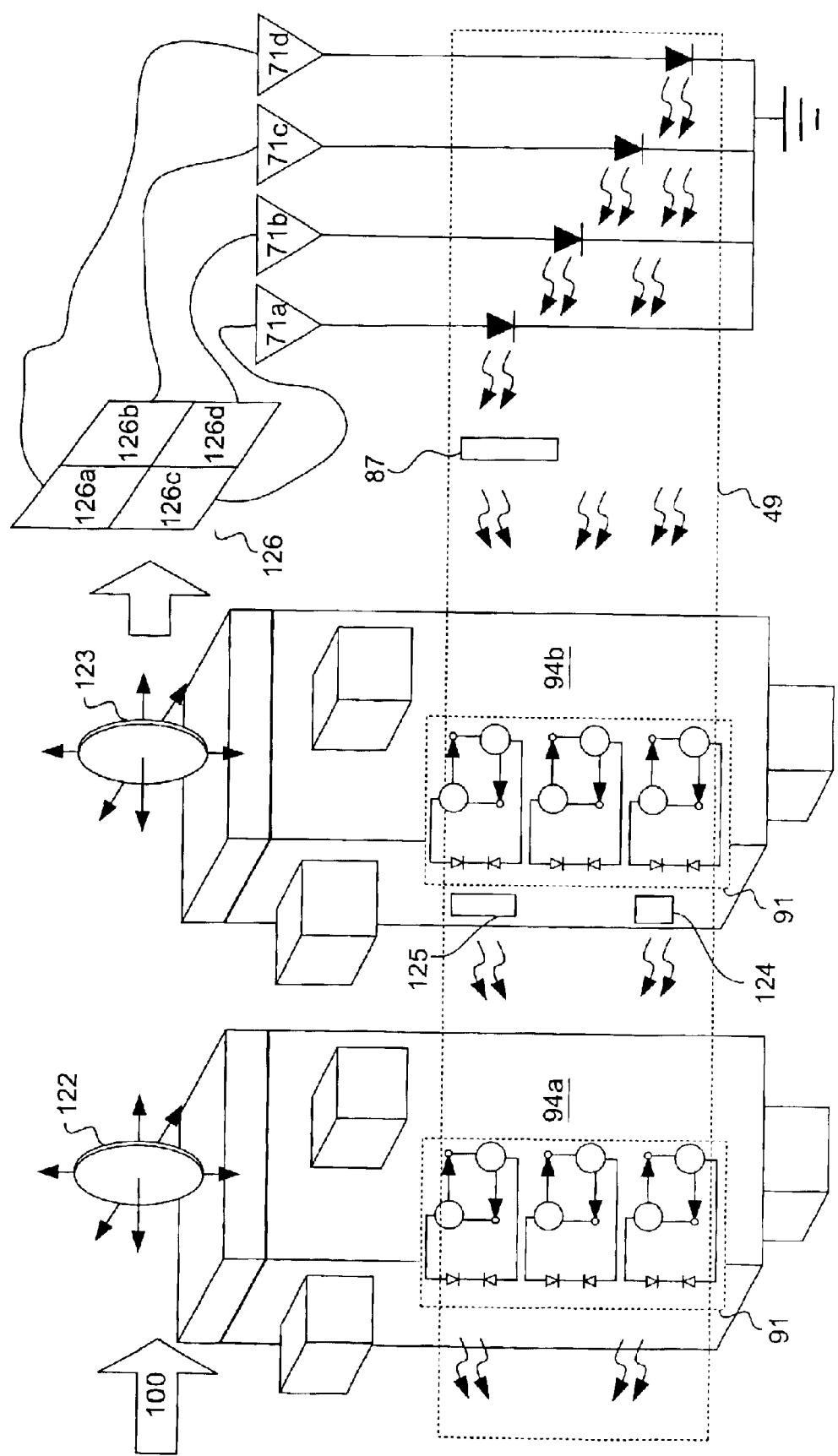
FIG. 11 illustrates a multi amplifier dual optically coupled automated component alignment system; and, FIG. 12 illustrates a multi axis positioning stage control circuit for sequential and parallel process flow during aligning a component.

In the embodiment shown in FIG. 11, a light source 100 is incident on an alignment system. Wherein light output from the source 100, propagates through a plurality of optical components 122, 123, and illuminates a quadrant detector 126, having photodetector elements 126a, 126b, 126c, 126d arranged in a predetermined manner therein. Each of the photodetector elements couples to one of a plurality of CGA circuits, 71a, 71b, 71 c, 71 d respectively, for further coupling of each CGA output to an OSC. Each OSC is optically coupled to an OSC. Each OSC is coupled to a motorized multi axis component positioning mechanism 94b, 94a. Optical elements 124, 125, and 87 are disposed within the optically communicative medium 49 in order to interact with the light emitted from each of the OCSs. These optical elements are optical elements such as filters and attenuators. These optical elements can take the form of pigtailed fibre optic components, such as those used in telecommunication. Within each of the OSCs, 91, the alignment method executes on the components 122 and 123 independence upon the optical power detected by photodetector 126 propagating through the optical system.

In the case of an automated alignment system, it may be desirable to have control over which axes of the motorized component positioning mechanism 94 are currently being controller by the NC for execution of the alignment method. It may not always be preferable to execute the alignment method on all components simultaneously, but rather move each of the components sequentially, and to move each of the axes within a motorized component positioning mechanism individually, with one process following another.

Figure 12:
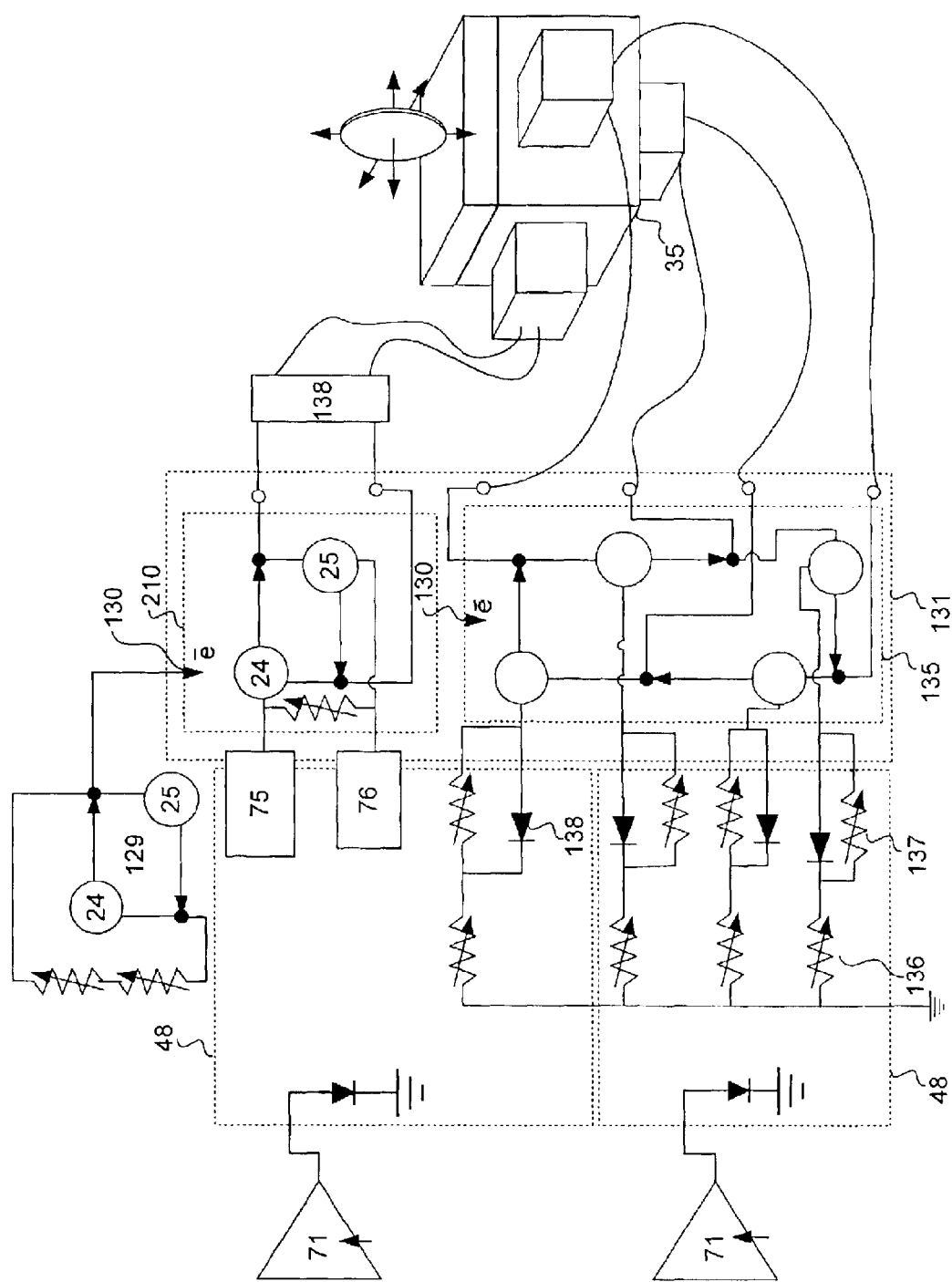

As is shown in FIG. 12, each controller circuit, 210 and 135, has an enable port 130. The enable port 130 is used for enabling or disabling the complementary output signals for each neural controller circuit. The enable port accepts enable signals at either a HI level or at a LO level. Where, an active LO level enables the neural controller circuit output signals. Output ports from NC 210 are coupled to a configurable drive amplifier circuit (CDA) 138.

A sequential neural controller circuit (SNC) 135 comprises a ring architecture of a plurality of neurons. Each output port from one of the neurons couples to an input port of another neuron, in a ring architecture as shown in 135. In this manner, four output signal, each having a predetermined time duration, are output from four output ports as part of the SNC. Into input ports of the SNC, four optical coupling detectors are coupled thereto. Each of the photodetectors 138 is in parallel with a variable resistor 137 for varying the resistance applied to each of the NC input ports. Photodetectors 138, and optical coupling detectors 75 and 76 are within one of the two optically communicative mediums 49. Each medium 49 receiving a portion of the optical alignment signal from an at least one OCS optically coupled thereto. During sequential executing of the alignment method, at least two different axes are controlled in sequence. For instance if the X and Y axes are being sequentially aligned, then the component will move in a +X, direction, then −Y, −X, +Y, +X, for example, where the sequential alignment method repeats until disabled 130, or until it reaches the lockup frequency.

This control port 130 is used for enabling or disabling the operation of the alignment method executing within NC circuits. This control port 130 is typically coupled to another neural controller circuit. An active LO level applied to the control port 130 enables execution of the alignment method within the neural controller, and an active HI level applied to the control port 130 of the neural controller circuit causes the execution of the alignment method to stop. Coupling of this control port to another NC 129, allows the other NC 129 to enable the execution of the alignment method within the controlled NC 210 for a predetermined amount of time in dependence upon the output signal time from this neural controller circuit 129. Advantageously, building a hierarchy of neural controller circuits, where enables are used on some of the neural controller circuits to enable timing of alignment method processes, allows for the creation of a very dynamic automated component alignment system.

Depending upon the type of actuation mechanism used for the positioning of the component, the position of the component will either remain fixed for a latching component positioning mechanism. Many state of the art linear motor actuators mechanisms comprise a latching mechanism, where in latching mode, upon removing electrical power to the actuator the position of the actuator will remains approximately fixed.

If a minimal optical intensity is provided on the OCS, then the frequency of the complementary NC output signals is quite low. When the NC is used in active alignment experiments, each displacement of the component, as well as reading of the photodetectors, is initiated in direct correlation with the transition in the NC output signals. Therefore if an actuator with a fast enough response time is used, then the NC will form a lock-in detection system where the displacement of the component at the frequency of the NC output signal becomes the lock-in frequency for the NC. Of course this frequency will vary as the point of optimal alignment is approached. The NC initiates the read of a photodetector after the transition edge from a second level to a first level and integrating the optical power during this time until a transition back to a second level. Direct optical feedback form the alignment system enables the neural controller to form a very specific type of integrating lock-in signal detection for each controlled axis.

The effects of biasing mechanics are reduced through the use of the CDA 138. Within the CDA a processor determines a predetermined amplification response, or relationship, between NC output signals and the actuator control signal. A relationship between NC output signal times and actuator displacement, for the actuator coupled to a single axis, is determined, such that for a constant output signal time the approximate change in detected optical power as a result of the bi-directional component displacement is approximately constant for each direction for an approximately constant frequency applied NC complementary output signal.

In this calibration mode, for each axis, the processor within the CDA is used to dynamically measure the change in optical power in response to the NC output signal applied to each actuator for displacing the component in the actuated axis. The processor processes the optical power response of component and predetermines a control signal provided to the actuator, for a plurality of NC output signal frequencies. This calibrated relationship provides for a NC complementary output signal to actuator control signal in such a manner that optical alignment system biasing mechanics for a given axis are minimized.

Minimizing alignment system unbalanced mechanical biasing in a plurality of axes results in an automated alignment system which has a high potential for fast alignment times. Since the predetermined amplification response is known for each axis, each of the components can be oscillated at higher frequencies because of known calibrated response curves, which when used for dynamically positioning the component result in an approximately bias free response dynamic response.

In some cases multiple CGAs, one for each axis, may have to be used in order to obtain the highest possible alignment speeds. The CGA response can be varied to specifically respond to unique control signal requirements for each axis. Advantageously, after calibration and in use, during aligning of components using a parallel or sequential alignment processes, the gain profile within each CGA is varied in such a manner as to facilitate the fastest alignment times. The type of amplification within the CGA and the calibrated response within the CDA are both controlled to obtain fastest alignment times.

Also within the calibration mode, the lockup frequency for each of the automated component axes is measured, for each of the actuators automating component position in that axis, thereby resulting in known lockup frequencies for each of the automated axes within the system to be grouped in dependence upon their lockup frequency. In this manner, a CGA is provided for each group such that by varying an input signal to the control port of the CGA makes all the automated axes grouped within this group, to lockup when the frequency of the NC output signals frequency is within the frequency band of the group. To facilitate this coupling of similar response axes within the group, optical fibres can be used as the optically communicative medium in order to optically link OSCs, SOSCs and CGAs.

Continuous execution of the alignment method within the OSCs coupled to actuators and components in an optical alignment system, results in a potential reduction in the effect of external vibrations on the optical set-up during the active aligning. When the alignment system is aligned, with the components in optimal position, the alignment method is still executing. If a low frequency vibration occurs while al component is positioned in a position of optimal alignment the alignment method will compensate for the vibration by re-converging the components back to a position of optimal alignment. The faster the frequency response of the component positioning mechanism, the faster the component can be positioned and the higher the frequency of external vibrations that the alignment system can withstand. A voice coil actuating mechanism for the component is an alternate method of positioning of the component because the actuator satisfies the main criteria of having the capacity for high frequency operation. On average voice coils, such as the ones used in speakers, have a frequency response up to around 20 kHz. Coupling this form of actuator mechanism to an component allows for the greatest range of operating frequencies, large displacement, providing the fastest form of actuation for the component as well as allowing for a light and compact component actuation mechanism. Many other embodiments of a voice coil actuator maybe envisioned for this purpose, as well as using more than one voice coil actuator per axis. However, in order to maximize the effectiveness of voice coil actuators in high speed alignment systems, coupling of bulky positioning stages to the voice coil actuator is not desirable. Using multi axis linear bearing stages as well as flexure stages decreases the potential top speed with which the voice coil actuator can operate.

Reference is made to this circuit because of the simplicity involved in using and constructing such a control circuit, as well as the circuit lending itself to this type of application. Other controller circuits, or other software and hardware representations thereof, may be envisioned without departing from the scope or simplicity of this invention.

The above system is described for component alignment in general, but it particularly advantageous when applied to alignment of optical components.

Numerous other embodiments are envisaged without departing from the spirit or scope of the invention.

What I claim is:

1. An alignment system for aligning a first component in relation to an optical signal comprising:
    an optical path having a path input port, for receiving light incident thereon from the optical signal, and a path output port;
    a first photodetector optically coupled to the optical path output port for detecting incident light thereon and for generating a photocurrent signal in dependence thereon;
    an actuator mechanism for moving, in response to a control signal, the first component within at least a portion of the optical path, between the path input port and the path output port, the actuator mechanism having a frequency response sufficiently high to allow displacement of the first component within the at least a portion of the optical path, resulting in an optical loss variation of less than a specified allowable optical loss for detection at the detector and caused by the first component displacement when the first component is approximately aligned within the at least a portion of the optical path about a point of substantial alignment; and,
    a controller circuit coupled to the photodetector for receiving the photocurrent signal, the controller circuit for providing the control signal to the actuator in dependence upon the photocurrent signal from the photodetector, where the control signal is indicative of a non-zero displacement of the first component about the point of substantial alignment within the at least a portion of the optical path.

2. An alignment system according to claim 1 comprising: a processor within the control circuit, the processor for integrating the photocurrent signal received from the photodetector coupled thereto and for providing the control signal to the actuator.

3. An alignment system according to claim 2 wherein the controller circuit comprises: a circuit for varying the control signal in time, with a frequency of the control signal dependent upon an intensity of integrated photocurrent signal received by the processor.

4. An alignment system according to claim 3 wherein the controller circuit comprises: a circuit for varying the control signal in electrical potential.

5. An alignment system according to claim 3 wherein the actuator comprises a bi-directional actuator for, in response the control signal, displacing the component in a first direction and a second direction.

6. An alignment system according to claim 8 wherein the actuator has a frequency response approximately sufficient such that non-zero displacement of the component is approximately at the frequency of the control signal provided to the actuator by the controller circuit.

7. An alignment system according to claim 1 wherein the controller circuit comprises an optically communicative medium, wherein the controller circuit is optically coupled to the photodetector through the optically communicative medium.

8. An alignment system according to claim 7 wherein the controller circuit comprises: a configurable gain amplifier coupled to the photodetector, the configurable gain amplifier disposed for receiving the photocurrent signal and for generating an output voltage in dependence upon the photocurrent signal.

9. An alignment system according to claim 8 wherein the controller circuit comprises: an optical coupling source disposed for receiving the output voltage from the configurable gain amplifier, and for in use emitting light into the optically communicative medium.

10. An alignment system according to claim 9 wherein the controller circuit comprises: at least one optical coupling detector disposed for receiving light propagating within the optically communicative medium, the optical coupling detector for receiving the output voltage from the configurable gain amplifier and for providing a second photocurrent signal for use in providing the control signal to the actuator.

11. An alignment system according to claim 10 wherein the controller circuit comprises: an optically absorptive element disposed, at least partially, within the optically communicative medium, between the optical coupling source and the optical coupling detector, the optically absorptive element interacting with the light propagating within the optically communicative medium.

12. An alignment system according to claim 7 wherein the optically communicative medium comprises glass.

13. An alignment system according to claim 7 wherein the optically communicative medium is air.

14. An alignment system according to claim 1 wherein the actuator mechanism comprises a voice coil mechanism.

15. An alignment system according to claim 14 wherein the actuator mechanism is absent a flexure system.

16. An alignment system according to claim 10 comprising: a plurality of component actuator mechanisms for aligning the first component in relation to a plurality of axes, each one of the plurality of actuator mechanisms coupled to a different controller circuit disposed for receiving light propagating within the optically communicative via at least one optical coupling detector.

17. An alignment system according to claim 16 wherein the controller circuit comprises a plurality of optical coupling sources disposed within the optically communicative medium, each of the optical coupling sources coupled to a different configurable gain amplifier for responding to the control voltage generated by the configurable gain amplifier coupled thereto.

18. An alignment system according to claim 10 comprising: a plurality of component actuator mechanisms for aligning a plurality of components in relation to a plurality of axes, the plurality of component actuator mechanisms each coupled to a different controller circuit.

19. An alignment system according to claim 18 wherein each controller circuit is disposed for receiving light propagating within the optically communicative environment via at least one optical coupling detector.

20. An alignment system according to claim 8 wherein the configurable gain amplifier is AC coupled for receiving a time varying portion of the photocurrent signal and for generating an output voltage in dependence upon the time varying photocurrent signal.

21. An alignment system according to claim 1 wherein the actuator mechanism comprises actuators for moving the component relative to at least two axes.

22. An alignment system according to claim 1 wherein the controller circuit is a neural network circuit.

23. A method of aligning a component in relation to an optical signal comprising the steps of:
providing the component within at least a portion of an optical path having a path input port and a path output port;
providing an optical signal along the optical path;
iterating the steps of:
detecting light within an optical path and generating a photocurrent signal based thereon;
generating a control signal based on the photocurrent signal and based on past iterations;
moving, in response to the control signal, the first component, within at least a portion of the optical path between the path input port and the path output port, with a frequency response sufficiently high to allow displacement of the first component within the optic path resulting in an optical loss variation for detection; and,
determining based on photocurrent from the first photodetector, during movement of the first component and based on a previous iterations, a first direction in relation to the optical path, wherein when the component is in an approximately aligned state the component has non-zero displacement about the approximately aligned state.

24. A method of aligning a component according to claim 23 wherein the step of determining based on photocurrent is a step of integrating photocurrent from the first photodetector over time.

25. A method of aligning a component according to claim 24 wherein an amount of component movement is dependent upon an amount of integrated photocurrent over time.

26. A method of aligning a component according to claim 25 wherein the amount of component movement is less for a larger amount of integrated photocurrent.

27. A method of aligning a component according to claim 26 where, if the amount of integrated photocurrent during movement of the optical component within a subsequent iteration is more than the amount of integrated photocurrent during movement of the component in a previous iteration, then a subsequent movement of the component is less than the previous movement thereof.

28. An alignment system according to claim 27 wherein the component is partially optically absorptive when interacting with the at least a portion of the optical signal.

29. A method of aligning a component according to claim 28 wherein the control signal is variable in time, and has a frequency dependence upon an amount of integrated photocurrent over time.

30. A method of aligning a component according to claim 29 wherein the control signal is variable in electrical potential.

31. A method of aligning a component according to claim 29 wherein the movement of the component is in one of two directions in response the control signal.

32. A method of aligning a component according to claim 31 wherein the frequency of the control signal is higher when a larger amount of integrated photocurrent is received from the photodetector.

33. A method of aligning a component according to claim 32 wherein the control signal is dependent upon dynamic forces resulting from movement of the component.

34. A method of aligning a component according to claim 33 comprising the steps of:
predetermining a relationship between the dynamic forces resulting from movement of the component; and;
applying a control signal to the actuator in dependence upon the predetermined relationship in order to minimize the effects of the dynamic forces.

35. A method of aligning a component according to claim 32 wherein movement of the component in alternating one of the two directions is approximately at the frequency of the control signal.

36. A method of aligning a component according to claim 28 wherein the iterative steps are performed in parallel for each of a plurality of axes for alignment of the component relative thereto.

37. A method of aligning a component according to claim 23 wherein the iterative steps are performed in sequence for more than one axis for alignment of the component relative thereto.

38. A method of aligning a component according to claim 23 wherein the iterative steps are performed in parallel for at least two axes and sequentially for at least another two axes for aligning of at least one component relative thereto.

39. A method of aligning a first component in relation to an optical signal comprising the steps of:
providing an optical path having a path input port, for receiving light incident thereon from the optical signal, and a path output port;
providing a first photodetector optically coupled to the path output port for detecting incident light and for each generating a photocurrent signal therefrom;
providing an actuator mechanism for moving, in response to a control signal, the first component, within at least a portion of the optical path between the path input port and the path output port, the actuator mechanism having a frequency response sufficiently high to allow displacement of the first component within the at least a portion of the optic path resulting in an optical loss variation detected at the detector;
providing a controller circuit coupled to the photodetector for receiving a photocurrent signal from each photodetector in dependence upon an intensity of light incident upon the photodetector and for providing a control signal to the actuator in dependence upon the photocurrent signal from the photodetector;
integrating photocurrent, over time, from the first photodetector during movement of the component by the actuator mechanism, in response to the control signal, within the at least a portion of the first optical path, from the first state to a second state, the component having a first displacement in a first direction in relation to the optical paths;

moving the component, within the at least a portion of the optical path, from the second state to a third state, the component having a second displacement in a second direction in relation to the optical paths;

integrating photocurrent, over time, from the first photodetector during movement of the component, within the at least a portion of the optical path, from the second state to the third state;

moving the component, within the at least a portion of the optical path, from the second state to a third state, the component having a third displacement in the first direction in relation to the optical paths;

integrating photocurrent, over time, from the first photodetector during movement of the component, within the at least a portion of the optical path, from the second state to the third state, wherein if an amount of integrated photocurrent, over time, during movement of the optical component from the second state to the third state is larger than an amount of integrated photocurrent, over time, during movement of the component from the first state to the second state, then the third displacement of the component is less than the second displacement.

* * * * *